US012341248B1

(12) United States Patent
Waschenko et al.

(10) Patent No.: US 12,341,248 B1

(45) Date of Patent: Jun. 24, 2025

(54) ANTENNA AND METHODS OF TRANSMITTING AND RECEIVING SIGNALS

(71) Applicant: CAES SYSTEMS LLC, Arlington, VA (US)

(72) Inventors: Donald P. Waschenko, Philadelphia, PA (US); Paul Mooney, Miller Place, NY (US); Daniel Martin, Lansdale, PA (US); Kenneth Plate, Bohemia, NY (US); John Fenick, San Diego, CA (US)

(73) Assignee: CAES SYSTEMS LLC, Arlington, VA (US)

(*) Notice: Subject to any disclaimer, the term of this patent is extended or adjusted under 35 U.S.C. 154(b) by 182 days.

(21) Appl. No.: 18/181,082

(22) Filed: Mar. 9, 2023

(51) Int. Cl.
*H01Q 15/00* (2006.01)

(52) U.S. Cl.
CPC ............................... *H01Q 15/0086* (2013.01)

(58) Field of Classification Search
CPC ...... H01Q 7/00; H01Q 15/00; H01Q 15/0086; H01Q 19/06
See application file for complete search history.

(56) References Cited

U.S. PATENT DOCUMENTS

| | | | | |
|---|---|---|---|---|
| 6,995,711 | B2 * | 2/2006 | Killen | H01Q 9/0414 343/700 MS |
| 9,035,831 | B2 * | 5/2015 | Mookiah | H01Q 15/0053 343/895 |
| 9,231,309 | B2 * | 1/2016 | Dede | H01F 5/003 |
| 11,329,517 | B2 * | 5/2022 | Yoon | H01Q 15/0086 |
| 11,888,225 | B2 * | 1/2024 | Kim | H01Q 1/02 |

* cited by examiner

*Primary Examiner* — Tho G Phan
(74) *Attorney, Agent, or Firm* — ALSTON & BIRD LLP

(57) ABSTRACT

An example antenna and methods of transmitting and receiving signals are provided herein. In some embodiments, the antenna may include a metamaterial. In some embodiments, the metamaterial may include a plurality of magnetic layers. In this regard, the plurality of magnetic layers may be orientated along an axial direction of the metamaterial. In some embodiments, each of the plurality of magnetic layers may include a plurality of magnetic particles dispersed in a dielectric. In some embodiments, the antenna may include an electrical conductor. In this regard, the electrical conductor may include a coil that surrounds the metamaterial. In some embodiments, the antenna may be configured to transmit and/or receive signals having a frequency in the high frequency (HF) range.

20 Claims, 10 Drawing Sheets

ANTENNA AND METHODS OF TRANSMITTING AND RECEIVING SIGNALS

TECHNOLOGICAL FIELD

Embodiments of the present disclosure relate generally to an antenna and methods of transmitting and receiving signals.

BACKGROUND

Antennas are used in numerous electrical systems to transmit and receive signals. In many electrical systems, it is desirable to have an efficient and wide bandwidth antenna. For example, it may be desirable to have an efficient antenna capable of transmitting and/or receiving signals over a specific wide bandwidth, such as signals having a frequency between approximately 2 MHz and 60 MHz (e.g., signals in the high frequency (HF) range of 3 MHz to 30 MHz).

Conventional approaches for antennas capable of transmitting and/or receiving signals over a specific wide bandwidth, such as signals having a frequency between approximately 2 MHz and 60 MHz, include a ferrite rod having an electrical connector wrapped around the ferrite rod. However, such antennas are often inefficient and have a narrow bandwidth. Accordingly, having an efficient antenna capable of transmitting and/or receiving signals over a specific wide bandwidth, such as signals having a frequency between approximately 2 MHz and 60 MHz, would be beneficial.

Through applied effort, ingenuity, and innovation, many of these identified problems have been solved by developing solutions that are included in embodiments of the present disclosure, many examples of which are described in detail herein.

BRIEF SUMMARY

Various embodiments described herein relate to an antenna and methods of transmitting and receiving signals.

In accordance with one aspect of the disclosure, an antenna is provided. In some embodiments, the antenna may include a metamaterial comprising a plurality of magnetic layers. In some embodiments, the plurality of magnetic layers are orientated along an axial direction of the metamaterial. In some embodiments, the antenna may include an electrical conductor. In some embodiments, the electrical conductor comprises a coil surrounding the metamaterial In some embodiments, each of the plurality of magnetic layers comprises a plurality of magnetic particles dispersed in a dielectric.

In some embodiments, the plurality of magnetic particles comprise carbonyl iron.

In some embodiments, each of the plurality of magnetic layers are separated by an adhesive.

In some embodiments, the antenna may include a housing disposed between the metamaterial and the coil.

In some embodiments, the antenna is configured to transmit or receive a signal having a frequency between 2 MHz and 60 MHz.

In some embodiments, the antenna has a maximum linear dimension of less than 50 cm.

In some embodiments, the metamaterial has a substantially cylindrical cross-sectional shape.

In some embodiments, the coil has a number of turns. In some embodiments, the number of turns is proportional to an efficiency of the antenna.

In some embodiments, the coil has a width. In some embodiments, the width is proportional to an efficiency of the antenna.

In accordance with another aspect of the disclosure, a method is provided. In some embodiments, the method may include receiving a signal via an antenna. In some embodiments, the antenna may include a metamaterial comprising a plurality of magnetic layers. In some embodiments, the plurality of magnetic layers are orientated along an axial direction of the metamaterial. In some embodiments, the antenna may include an electrical conductor. In some embodiments, the electrical conductor comprises a coil surrounding the metamaterial.

In some embodiments, the signal has a frequency between 2 MHz and 60 MHz.

In some embodiments, the coil has a number of turns. In some embodiments, the number of turns is proportional to an efficiency of the antenna.

In some embodiments, the coil has a width. In some embodiments, the width is proportional to an efficiency of the antenna.

In some embodiments, the method may include transmitting a second signal via the antenna.

In accordance with another aspect of the disclosure, a method is provided. In some embodiments, the method may include transmitting a signal via an antenna. In some embodiments, the antenna may include a metamaterial comprising a plurality of magnetic layers. In some embodiments, the plurality of magnetic layers are orientated along an axial direction of the metamaterial. In some embodiments, the antenna may include an electrical conductor. In some embodiments, the electrical conductor comprises a coil surrounding the metamaterial. In some embodiments, the signal has a frequency between 2 MHz and 60 MHz.

In some embodiments, the coil has a number of turns. In some embodiments, the number of turns is proportional to an efficiency of the antenna.

In some embodiments, the coil has a width. In some embodiments, the width is proportional to an efficiency of the antenna.

In some embodiments, the method may include receiving a second signal via the antenna.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
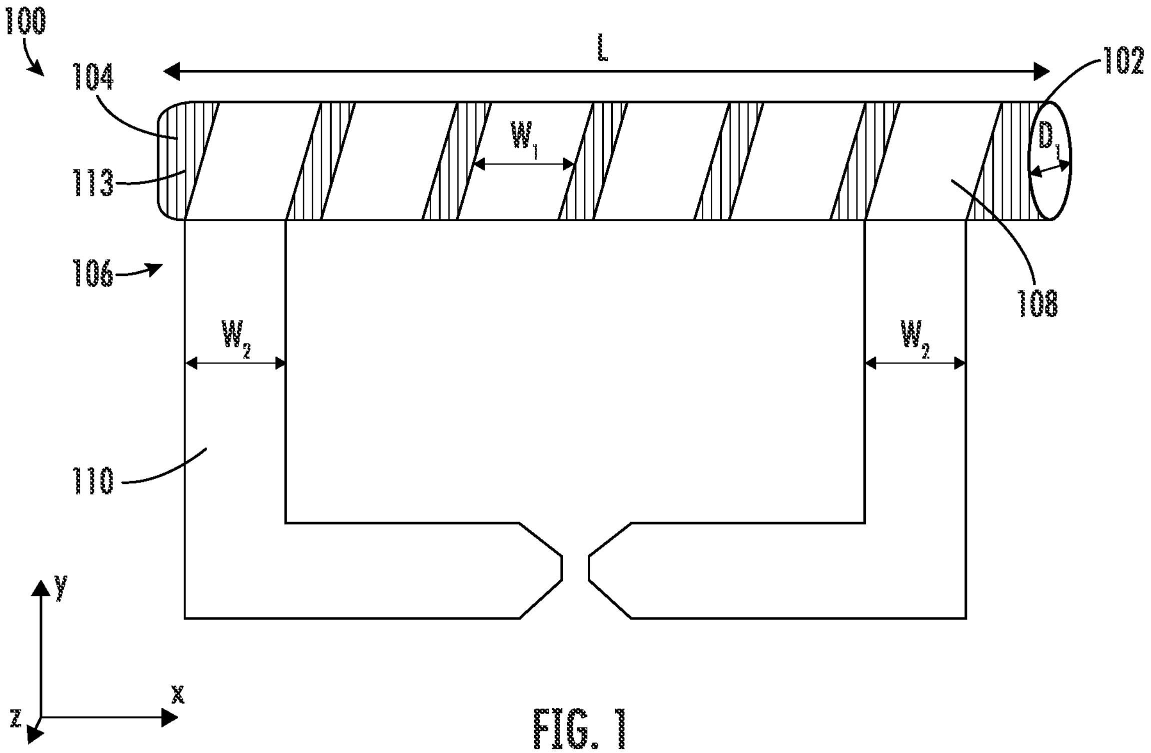
FIG. 1 illustrates a front view of an example antenna in accordance with one or more embodiments of the present disclosure.
Figure 2:
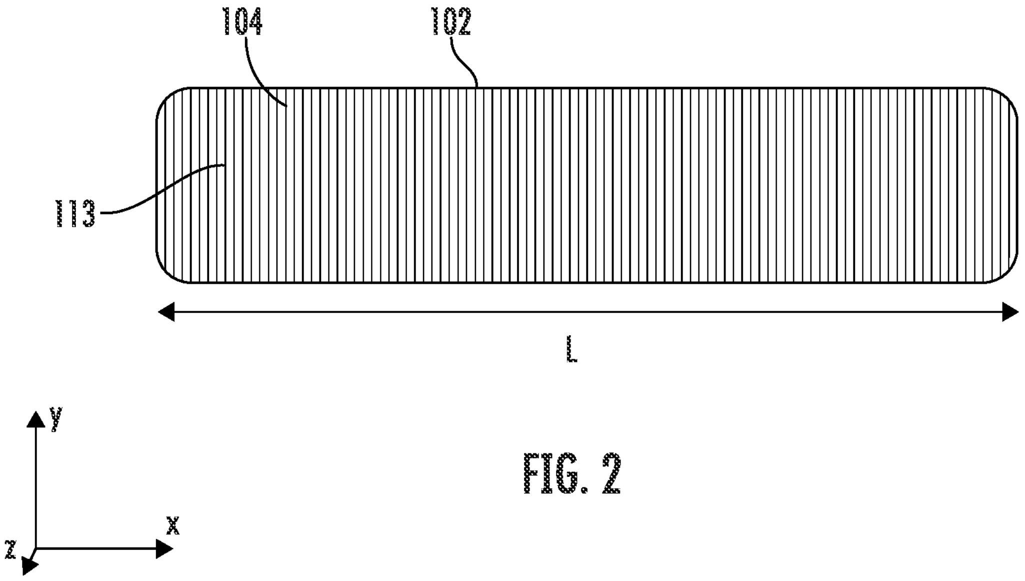
FIG. 2 illustrates a front view of an example metamaterial in accordance with one or more embodiments of the present disclosure.

Example embodiments will be described more fully hereinafter with reference to the accompanying drawings, in which some, but not all embodiments of disclosure are shown. Embodiments of the disclosure may be embodied in many different forms and should not be construed as limited to the embodiments set forth herein; rather, these embodiments are provided so that this disclosure satisfies applicable legal requirements. Like numbers refer to like elements throughout.

Overview

Example embodiments disclosed herein address technical problems associated with improving the efficiency and the bandwidth of an antenna. As would be understood by one skilled in the field to which this disclosure pertains, there are numerous example scenarios in which improving the efficiency and the bandwidth of an antenna is desirable.

In many applications, it is often desirable to have an efficient and wide bandwidth antenna. For example, it may be desirable to have an efficient antenna capable of transmitting and/or receiving signals over a specific wide bandwidth, such as signals having a frequency between approximately 2 MHz and 60 MHz (e.g., signals in the high frequency (HF) range of 3 MHz to 30 MHz).

Example solutions for antennas that transmit and/or receive signals having a frequency between approximately 2 MHz and 60 MHz include, for example, a ferrite rod having an electrical conductor wrapped around the ferrite rod. However, such antennas are often inefficient and have a narrow bandwidth. For example, such antennas are typically electrically small (e.g., the antenna has a maximum dimension that is less than $1/10^{th}$ the wavelength of the highest frequency signal the antenna 100 may transmit or receive), which may reduce the radiation resistance of the antenna and, as a result, decrease the efficiency of the antenna. As another example, the antenna may have a narrow bandwidth due to limits in the magnetic properties of ferrite rod (e.g., the permeability of the ferrite rod may be a constraint on the bandwidth of the antenna).

Thus, to address these and/or other issues related to improving the efficiency and/or the bandwidth of an antenna, an example antenna and methods of transmitting and receiving signals are disclosed herein. For example, an embodiment in this disclosure, described in greater detail below, includes a metamaterial having a plurality of magnetic layers. In some examples, the plurality of magnetic layers are orientated along an axial direction of the metamaterial. In some examples, the antenna may further include an electrical conductor having a coil surrounding the metamaterial. In some examples, the orientation of the plurality of magnetic layers may increase the permeability of the metamaterial (e.g., relative to a permeability of the magnetic layers and/or a permeability of a ferrite rod) and/or increase the radiation resistance of the antenna. Thus, increasing the bandwidth and the efficiency of the antenna.

Example Antenna

With reference to FIGS. 1-7, embodiments herein provide for an example antenna 100. In some embodiments, the antenna 100 may be a loopstick antenna. In some embodiments, the antenna 100 may be configured to transmit and/or receive a signal having a frequency between approximately 2 MHz and 60 MHz. For example, the antenna 100 may be configured to transmit and/or receive signals having a frequency in the high frequency (HF) range (e.g., a frequency between 3 MHz and 30 MHz).

In some embodiments, the antenna 100 may have a maximum dimension that is less than $1/10^{th}$ the wavelength of the highest frequency signal the antenna 100 may transmit or receive.

In this regard, for example, if the antenna 100 is transmitting or receiving a signal having a frequency of approximately 60 MHz, the signal may have a wavelength of approximately 5 m. As such, in some embodiments for example, the antenna 100 may have a maximum linear dimension of less than approximately 50 cm. Accordingly, in some embodiments, the antenna 100 may be an electrically small antenna.

In some embodiments, the antenna 100 may include a metamaterial 102. In some embodiments, the metamaterial 102 may be substantially rectangular or substantially cylindrical in cross-sectional shape. The metamaterial 102 may be associated with a length L and a diameter $D_1$ (e.g., or a width $W_1$ if the metamaterial 102 has a substantially square cross-section, or widths $W_1$ and/or $W_2$ if the metamaterial 102 has a substantially rectangular cross-section). The length L may be greater than the diameter $D_1$. For example, the length L of the metamaterial 102 may be between approximately 2 cm and 20 cm and the diameter $D_1$ may be between approximately 0.5 cm and 10 cm.

In some embodiments, the metamaterial 102 may include a plurality of magnetic layers 104. In some embodiments, each of the plurality of magnetic layers 104 may be substantially rectangular or substantially cylindrical in cross-sectional shape. In some embodiments, each of the plurality of magnetic layers 104 may be substantially the same shape as the metamaterial 102. For example if the metamaterial 102 is substantially cylindrical, each of the plurality of magnetic layers 104 may also be substantially cylindrical, and if the metamaterial 102 is substantially rectangular, each of the plurality of magnetic layers 104 may also be substantially rectangular.

In some embodiments, each of the plurality of magnetic layers 104 may be associated with a diameter $D_2$ (e.g., or a width $W_1$ if each of the plurality of magnetic layers 104 has a substantially square cross-section, or widths $W_1$ and/or $W_2$ if each of the plurality of magnetic layers 104 has a substantially rectangular cross-section). In some embodiments, the diameter $D_2$ may be between approximately 0.5 cm and 10 cm. In this regard, for example, the diameter $D_2$ associated with each of the plurality of magnetic layers 104 may be approximately equal to the diameter $D_1$ of the metamaterial 102. In some embodiments, increasing the diameter $D_2$ may increase the bandwidth of the antenna 100. For example, the bandwidth of the antenna 100 may be greater when diameter $D_2$ is equal to 10 cm than when diameter $D_2$ is equal to 0.5 cm.

In some embodiments, the diameter $D_2$ of each of the plurality of magnetic layers 104 may be substantially the same. Alternatively, in some embodiments, the diameter $D_2$ of the some or all of the plurality of magnetic layers 104 may be different. For example, some magnetic layers of the plurality of magnetic layers 104 may have a first diameter $D_i$ while other magnetic layers of the plurality of magnetic layers 104 may have a second diameter $D_{ii}$.

Figure 5:
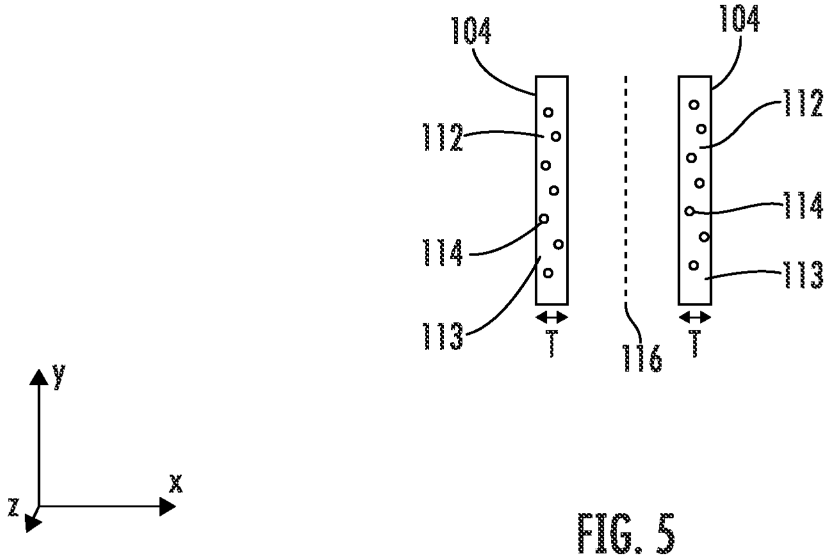
FIG. 5 illustrates a schematic view of example magnetic layers and an example adhesive in accordance with one or more embodiments of the present disclosure.

In some embodiments, such as depicted in FIG. 5, each of the plurality of magnetic layers 104 may be associated with a thickness T. In some embodiments, the thickness T may be between approximately 0.025 mm and 5 mm. In some embodiments, the thickness T of each of the plurality of magnetic layers 104 may be substantially the same. Alternatively, in some embodiments, the thickness T of the some or all of the plurality of magnetic layers 104 may be different. For example, some magnetic layers of the plurality of magnetic layers 104 may have a first thickness $T_i$ while other magnetic layers of the plurality of magnetic layers 104 may have a second thickness $T_{ii}$. In some embodiments, the thickness T of each of the plurality of magnetic layers 104 may be less than the length L of the metamaterial 102. For example, the thickness T of each of the plurality of magnetic layers 104 may be approximately 0.5 mm, and the length L of the metamaterial 102 may be approximately 10 cm. In such an example, the metamaterial 102 may include approximately 200 magnetic layers.

In some embodiments, each of the plurality of magnetic layers 104 may include a plurality of magnetic particles 114. In some embodiments, the plurality of magnetic particles 114 may be dispersed in a dielectric 112. In some embodiments, the plurality of magnetic particles 114 may comprise one or more of carbonyl iron barium ferrite nanoparticles (BaFeNPs), barium-strontium titanate (BST), barium ($BaFeO_2$), strontium iron oxide nanopowders ($SrFeO_2$), cobalt ferrite, nickel ferrite, and/or ferromagnetic graphene. In some embodiments, the dielectric 112 may comprise one or more of rubber, silicon, cyanate ester, bismaleimide, poly vinyl chloride (PVC), polyamides, poly (vinyl alcohol) (PVA), and/or urethane. For example, each of the plurality of magnetic layers 104 may comprise carbonyl iron particles dispersed in urethane.

Figure 3:
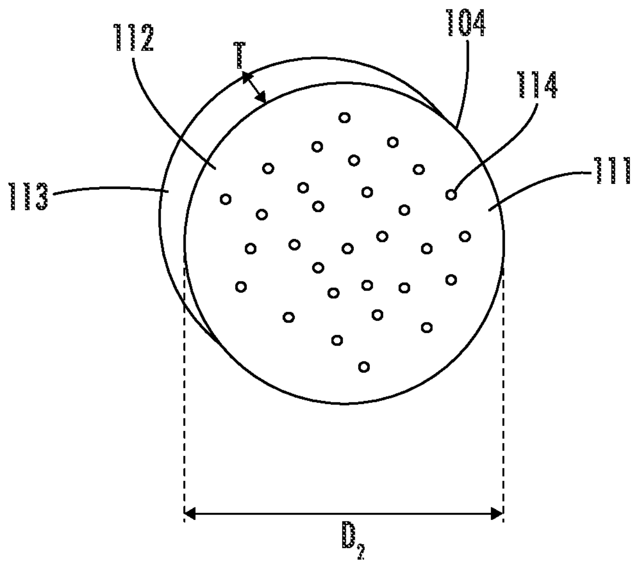
FIG. 3 illustrates a perspective view of an example magnetic layer in accordance with one or more embodiments of the present disclosure.
Figure 4:
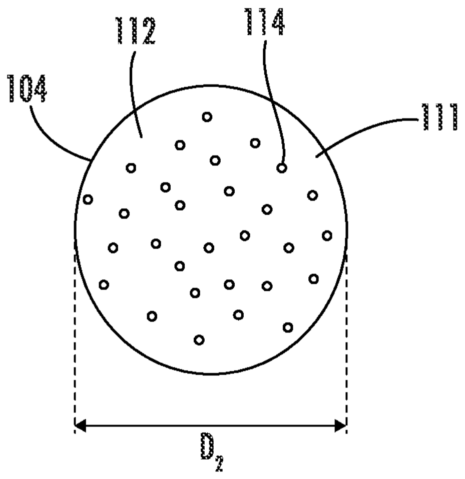
FIG. 4 illustrates a front view of the example magnetic layer in accordance with one or more embodiments of the present disclosure.

In some embodiments, such as depicted in FIGS. 3 and 4, each of the plurality of magnetic layers 104 may have a front face 111. In some embodiments, such as depicted in FIGS. 3 and 5, each of the plurality of magnetic layers 104 may have a side 113. In some embodiments, the plurality of magnetic layers 104 may be orientated along an axial direction of the metamaterial 102. In this regard, for example, the front face 111 of each of the plurality of magnetic layers 104 may be facing the x-direction, as defined in the exemplary orientation illustrated in FIGS. 1, 2, 5, and 6. Similarly, for example, the side 113 of each of the plurality of magnetic layers 104 may be facing in the z-direction (e.g., out of the page), as defined in the exemplary orientation illustrated in FIGS. 1, 2, 5, and 6.

In some embodiments, each of the plurality of magnetic layers 104 may be associated with a first permeability ($\mu_1$) based on an incident wave relative to the front face 111 of each of the plurality of magnetic layers 104. In some embodiments, the plurality of magnetic layers 104 (e.g., the plurality of magnetic layers 104 orientated along an axial direction of the metamaterial 102) may be associated with a second permeability ($\mu_2$) based on an incident wave relative to the side 113 of the plurality of magnetic layers 104 (e.g., relative to the metamaterial 102). In some embodiments, the second permeability ($\mu_2$) may be different than the first permeability ($\mu_1$). Said differently, by orientating the plurality of magnetic layers 104 along the axial direction of the metamaterial 102, the metamaterial 102 may have a different permeability (e.g., the second permeability ($\mu_2$)) than the permeability of each of the plurality of magnetic layers 104 in relation to an incident wave relative to the front face 111 of each of the plurality of magnetic layers 104 (e.g., the first permeability ((1)).

In some embodiments, the second permeability ($\mu_2$) may be greater than the first permeability ($\mu_1$). That is, in some embodiments, the metamaterial 102 may have a greater permeability (e.g., the second permeability ($\mu_2$)) than the permeability of each of the plurality of magnetic layers 104 in relation to an incident wave relative to the front face 111 of each of the plurality of magnetic layers 104 (e.g., the first permeability ($\mu_1$)). In some embodiments, the second permeability ($\mu_2$) may be between approximately 2 and 10 times greater than the first permeability ($\mu_1$). In some embodiments, the second permeability ($\mu_2$) being greater than the first permeability ($\mu_1$) may increase the bandwidth of the antenna 100. In some embodiments, the second permeability ($\mu_2$) being greater than the first permeability ($\mu_1$) may improve the efficiency of the antenna 100. In this regard, for example, the second permeability ($\mu_2$) being greater than the first permeability ($\mu_1$) increases an effective aperture size of the antenna 100, thus, increasing the efficiency of the antenna 100.

In some embodiments, such as depicted in FIG. 1, the antenna 100 may include an electrical conductor 106. In some embodiments, the electrical conductor 106 may include a coil 108. The coil 108 may surround the metamaterial 102 (e.g., the coil 108 may be wrapped around the metamaterial 102). In some embodiments, the electrical conductor 106 may include an electrical path 110. The electrical path 110 may be connected to the coil 108 and/or proximate the metamaterial 102. In some embodiments, the electrical conductor 106 may comprise a ribbon of electrically conductive material (e.g., a ribbon of copper) and/or a wire (e.g., a copper wire). For example, such as depicted in FIG. 1, the coil 108 and the electrical path 110 may be a ribbon of electrically conductive material. As another example, the coil 108 and the electrical path 110 may be a wire. As another example, the coil 108 may be a ribbon of electrically conductive material and the electrical path 110 may be a wire. As another example, the coil 108 may be a wire and the electrical path 110 may be a ribbon of electrically conductive material. In some embodiments, the electrical conductor 106 may comprise any electrically conductive material. For example, the electrical conductor 106 may comprise one or more of copper, aluminum, steel, iron, gold, silver, and/or graphite.

In some embodiments, the coil 108 may be associated with a width $W_1$ when the coil 108 is a ribbon of electrically conductive material (e.g., or a diameter when the coil 108 is a wire). In some embodiments, the electrical path 110 may be associated with a width $W_2$ when the electrical path 110 is a ribbon of electrically conductive material (e.g., or a diameter when electrical path 110 is a wire). In some embodiments, the width $W_1$ and the width $W_2$ may be the same. In some embodiments, the width $W_1$ may be greater than the width $W_2$. In some embodiments, the width $W_1$ may be less than the width $W_2$. In some embodiments, the width $W_1$ and/or the width $W_2$ may be between approximately 0.25 cm and 10 cm. In some embodiments, the coil 108 may have a number of turns around the metamaterial 102. In this regard, for example, a turn around the metamaterial 102 comprises a loop around the metamaterial 102.

In some embodiments, the width $W_1$ and/or the width $W_2$ may be proportional to the efficiency of the antenna 100. In some embodiments, increasing the width $W_1$ and/or the width $W_2$ may increase the efficiency of the antenna 100 and reducing the width $W_1$ and/or the width $W_2$ may decrease the efficiency of the antenna 100. For example, as an electrical size of the antenna 100 decreases (e.g., if the antenna 100 is an electrically small antenna having, for example, a maximum dimension that is less than $1/10^{th}$ the wavelength of the highest frequency signal the antenna 100 may transmit or receive) the radiation resistance of the antenna 100 may decrease. In this regard, as the radiation resistance of the antenna 100 decreases, the radiation resistance may become on the order of a loss resistance of the antenna 100. In some embodiments, if the radiation resistance becomes on the order of the lost resistance of the antenna 100, the antenna 100 may be inefficient. In some embodiments, increasing the width $W_1$ and/or the width $W_2$ may decrease the loss resistance of the antenna 100. Accordingly, increasing the width $W_1$ and/or the width $W_2$ may increase the efficiency of the antenna 100.

In some embodiments, the number of turns of the coil 108 may be proportional to the efficiency of the antenna 100. In some embodiments, decreasing the number of turns of the coil 108 may increase the efficiency of the antenna 100 and increasing the number of turns of the coil 108 may decrease the efficiency of the antenna 100. For example, as an electrical size of the antenna 100 decreases (e.g., if the antenna 100 is an electrically small antenna having, for example, a maximum dimension that is less than $1/10^{th}$ the wavelength of the highest frequency signal the antenna 100 may transmit or receive) the radiation resistance of the antenna 100 may decrease. In this regard, as the radiation resistance of the antenna 100 decreases, the radiation resistance may become on the order of a loss resistance of the antenna 100. In some embodiments, if the radiation resistance becomes on the order of the lost resistance of the antenna 100, the antenna 100 may be inefficient. In some embodiments, reducing the number of turns of the coil 108 may decrease the loss resistance of the antenna 100. Accordingly, decreasing the number of turns of the coil 108 may increase the efficiency of the antenna 100.

In some embodiments, such as depicted in FIG. 5, each of the plurality of magnetic layers 104 may be separated by an adhesive 116. For example, the adhesive 116 may be positioned in between each of the plurality of magnetic layers 104, such that each of the plurality of magnetic layers 104 are bound to another magnetic layer of the plurality of magnetic layers 104 (e.g., to form the metamaterial 102). In this regard, for example, the adhesive 116 may ensure that each of the plurality of magnetic layers 104 are orientated along the axial direction of the metamaterial 102 (e.g., that the front face 111 of each of the plurality of magnetic layers 104 may be facing the x-direction and the side 113 of each of the plurality of magnetic layers 104 may be facing in the z-direction (e.g., out of the page), as defined in the exemplary orientation illustrated in FIGS. 1, 2, 5, and 6). In some embodiments, the adhesive 116 may comprise a thin film of double sided tape and/or an adhesive solution.

Figure 6:
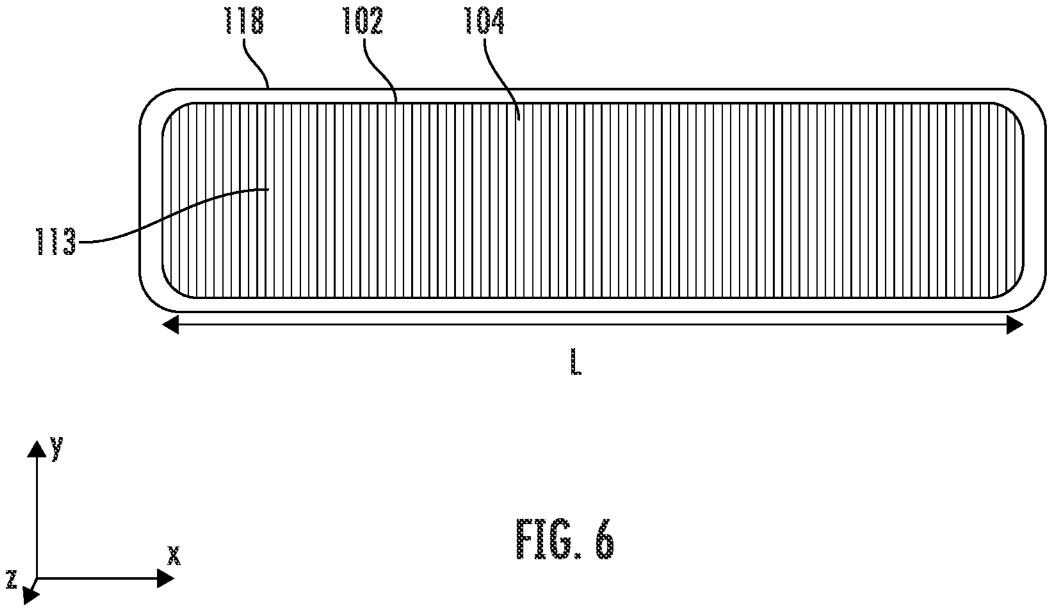
FIG. 6 illustrates a front view of the example metamaterial in accordance with one or more embodiments of the present disclosure.

In some embodiments, such as depicted in FIG. 6, the antenna 100 may include a housing 118. In some embodiments, the housing 118 may be disposed between the metamaterial 102 and the coil 108, such that each of the plurality of magnetic layers 104 are positioned proximate another magnetic layer of the plurality of magnetic layers 104 (e.g., to form the metamaterial 102). In this regard, for example, the housing 118 may ensure that each of the plurality of magnetic layers 104 are orientated along the axial direction of the metamaterial 102 (e.g., that the front face 111 of each of the plurality of magnetic layers 104 may be facing the x-direction and the side 113 of each of the plurality of magnetic layers 104 may be facing in the z-direction (e.g., out of the page), as defined in the exemplary orientation illustrated in FIGS. 1, 2, 5, and 6). In some embodiments, the housing 118 may be a plastic tube.

Figure 7:
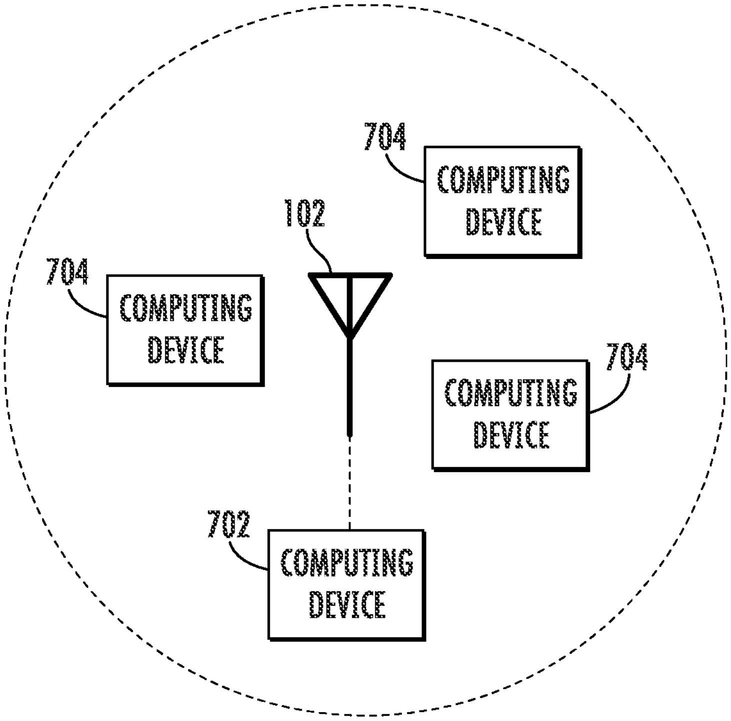
FIG. 7 illustrates an example antenna for transmitting or receiving a signal in accordance with one or more embodiments of the present disclosure.

In some embodiments, such as depicted in FIG. 7, the antenna 100 may be in communication with a first computing device 702. In this regard, the antenna 100 may be configured to transmit signals from the first computing device 702. For example, the antenna 100 may be configured to transmit signals from the first computing device 702 to one or more other computing devices 704. Additionally or alternatively, the antenna 100 may be configured to receive signals from the one or more other computing devices 704. For example, the antenna 100 may be configured to receive signals that the one or more other computing devices 704 transmit to the first computing device 702. Although the antenna 100 and the first computing device 702 are depicted as separate components in FIG. 7, it would be understood by one skilled in the field to which this disclosure pertains that, in some embodiments, the antenna 100 may be embodied within the first computing device 702.

Example Method

Figure 8:
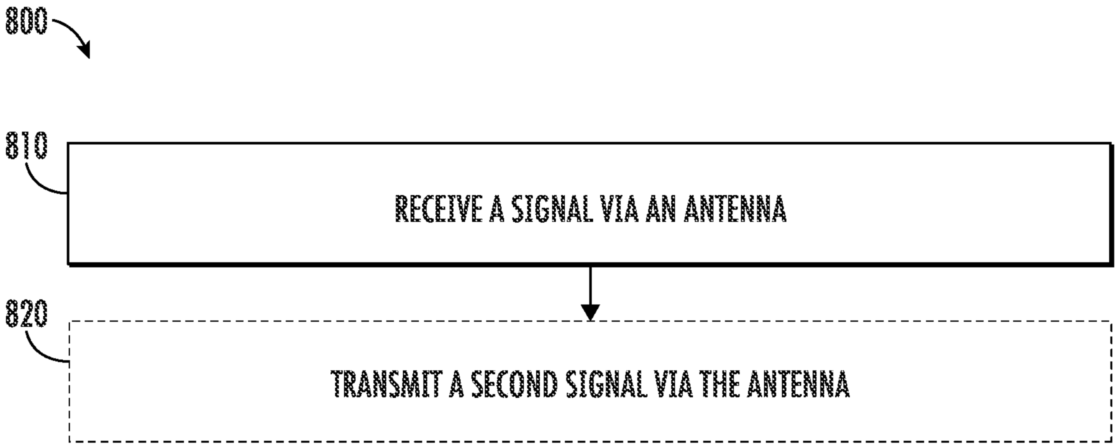
FIG. 8 illustrates a flowchart of an example method in accordance with one or more embodiments of the present disclosure.

Referring now to FIG. 8, a flowchart providing an example method 800 for receiving and, in some embodiments, transmitting a signal is illustrated. In this regard, FIG. 8 illustrates operations that may be performed by the antenna 100 and/or the first computing device 702. For example, in some embodiments, the operations illustrated in FIG. 8 may, for example, be performed by, with the assistance of, and/or under the control of the first computing device 702 (e.g., processing circuitry 1002, memory 1004, processor 1006, user interface 1008, and/or communication interface 1010), and/or the antenna 100.

As shown in block 810, the method 800 may include receiving a signal via an antenna. As described above, in some embodiments, the antenna may be configured to transmit and/or receive a signal having a frequency between approximately 2 MHz and 60 MHz. In some embodiments, the antenna may have a maximum dimension that is less than $1/10^{th}$ the wavelength of the highest frequency signal the antenna may transmit or receive. In this regard, for example, if the antenna is transmitting or receiving a signal having a frequency of approximately 60 MHz, the signal may have a wavelength of approximately 5 m. As such, in some embodiments for example, the antenna may have a maximum linear dimension of less than approximately 50 cm. Accordingly, in some embodiments, the antenna may be an electrically small antenna.

As described above, in some embodiments, the antenna may include a metamaterial. In some embodiments, the metamaterial may include a plurality of magnetic layers. In some embodiments, each of the plurality of magnetic layers may include a plurality of magnetic particles. In some embodiments, the plurality of magnetic particles may be dispersed in a dielectric. In some embodiments, the plurality of magnetic particles may comprise carbonyl iron. In some embodiments, the dielectric may comprise one or more of rubber, silicon, and/or urethane.

As described above, each of the plurality of magnetic layers may have a front face. In some embodiments, each of the plurality of magnetic layers may have a side. In some embodiments, the plurality of magnetic layers may be orientated along an axial direction of the metamaterial.

As described above, in some embodiments, each of the plurality of magnetic layers may be associated with a first permeability based on an incident wave relative to the front of each of the plurality of magnetic layers. In some embodiments, the plurality of magnetic layers (e.g., the plurality of magnetic layers orientated along an axial direction of the metamaterial) may be associated with a second permeability based on an incident wave relative to the side of the plurality of magnetic layers (e.g., relative to the metamaterial). In some embodiments, the second permeability may be greater than the first permeability. That is, in some embodiments, the metamaterial may have a greater permeability (e.g., the second permeability) than the permeability of each of the plurality of magnetic layers in relation to an incident wave relative to the front of each of the plurality of magnetic layers (e.g., the first permeability). In some embodiments, the second permeability being greater than the first permeability may increase the bandwidth of the antenna. In some embodiments, the second permeability being greater than the first permeability may improve the efficiency of the antenna.

As described above, the antenna may include an electrical conductor. In some embodiments, the electrical conductor may include a coil. The coil may surround the metamaterial (e.g., the coil may be wrapped around the metamaterial). In some embodiments, the electrical conductor may include an electrical path. In some embodiments, the coil may be associated with a width $W_1$ when the coil is a ribbon of electrically conductive material (e.g., or a diameter when the coil is a wire). In some embodiments, the electrical path may be associated with a width $W_2$ when the electrical path is a ribbon of electrically conductive material (e.g., or a diameter when electrical path is a wire). In some embodiments, the coil may have a number of turns around the metamaterial. In this regard, for example, a turn around the metamaterial comprises a loop around the metamaterial.

As described above, in some embodiments, the width $W_1$ and/or the width $W_2$ may be proportional to the efficiency of the antenna. In some embodiments, increasing the width $W_1$ and/or the width $W_2$ may increase the efficiency of the antenna and reducing the width $W_1$ and/or the width $W_2$ may decrease the efficiency of the antenna. In some embodiments, the number of turns of the coil 108 may be proportional to the efficiency of the antenna. In some embodiments, decreasing the number of turns of the coil may increase the efficiency of the antenna and increasing the number of turns of the coil may decrease the efficiency of the antenna.

As shown in block 820, the method 800 may optionally include transmitting a second signal via the antenna. As described above, the antenna may be in communication with a first computing device. In this regard, the antenna may be configured to transmit signals from the first computing device. For example, the antenna may be configured to transmit signals from the first computing device to one or more other computing devices. Additionally or alternatively, the antenna may be configured to receive signals from the one or more other computing devices. For example, the antenna may be configured to receive signals that the one or more other computing devices transmit to the first computing device.

Example Method

Figure 9:
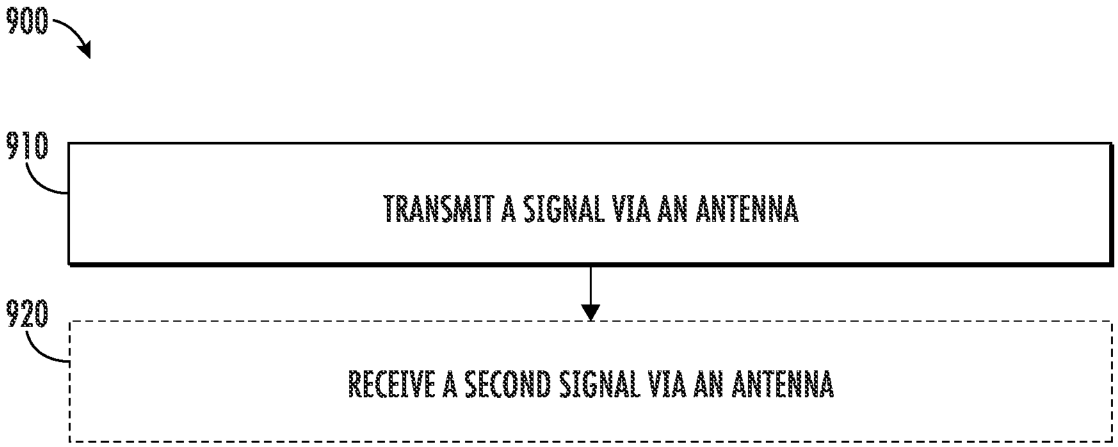
FIG. 9 illustrates a flowchart of an example method in accordance with one or more embodiments of the present disclosure.

Referring now to FIG. 9, a flowchart providing an example method 900 for transmitting and, in some embodiments, receiving a signal is illustrated. In this regard, FIG. 9 illustrates operations that may be performed by the antenna 100 and/or the first computing device 702. For example, in some embodiments, the operations illustrated in FIG. 9 may, for example, be performed by, with the assistance of, and/or under the control of the first computing device 702 (e.g., processing circuitry 1002, memory 1004, processor 1006, user interface 1008, and/or communication interface 1010), and/or the antenna 100.

As shown in block 910, the method 900 may include transmitting a signal via an antenna. As described above, in some embodiments, the antenna may be configured to transmit and/or receive a signal having a frequency between approximately 2 MHz and 60 MHz. In some embodiments, the antenna may have a maximum dimension that is less than $1/10^{th}$ the wavelength of the highest frequency signal the antenna may transmit or receive. In this regard, for example, if the antenna is transmitting or receiving a signal having a frequency of approximately 60 MHz, the signal may have a wavelength of approximately 5 m. As such, in some embodiments for example, the antenna may have a maximum linear dimension of less than approximately 50 cm. Accordingly, in some embodiments, the antenna may be an electrically small antenna.

As described above, in some embodiments, the antenna may include a metamaterial. In some embodiments, the metamaterial may include a plurality of magnetic layers. In some embodiments, each of the plurality of magnetic layers may include a plurality of magnetic particles. In some embodiments, the plurality of magnetic particles may be dispersed in a dielectric. In some embodiments, the plurality of magnetic particles may comprise one or more of carbonyl iron barium ferrite nanoparticles (BaFeNPs), barium-strontium titanate (BST), barium ($BaFeO_2$), strontium iron oxide nanopowders ($SrFeO_2$), cobalt ferrite, nickel ferrite, and/or ferromagnetic graphene. In some embodiments, the dielectric 112 may comprise one or more of rubber, silicon, cyanate ester, bismaleimide, poly vinyl chloride (PVC), polyamides, poly (vinyl alcohol) (PVA), and/or urethane.

As described above, each of the plurality of magnetic layers may have a front face. In some embodiments, each of the plurality of magnetic layers may have a side. In some embodiments, the plurality of magnetic layers may be orientated along an axial direction of the metamaterial.

As described above, in some embodiments, each of the plurality of magnetic layers may be associated with a first permeability based on an incident wave relative to the front of each of the plurality of magnetic layers. In some embodiments, the plurality of magnetic layers (e.g., the plurality of magnetic layers orientated along an axial direction of the metamaterial) may be associated with a second permeability based on an incident wave relative to the side of the plurality of magnetic layers (e.g., relative to the metamaterial). In some embodiments, the second permeability may be greater than the first permeability. That is, in some embodiments, the metamaterial may have a greater permeability (e.g., the second permeability) than the permeability of each of the plurality of magnetic layers in relation to an incident wave relative to the front of each of the plurality of magnetic layers (e.g., the first permeability). In some embodiments, the second permeability being greater than the first permeability may increase the bandwidth of the antenna. In some embodiments, the second permeability being greater than the first permeability may improve the efficiency of the antenna. In this regard, for example, the second permeability being greater than the first permeability increases an effective aperture size of the antenna, thus, increasing the efficiency of the antenna.

As described above, the antenna may include an electrical conductor. In some embodiments, the electrical conductor may include a coil. The coil may surround the metamaterial (e.g., the coil may be wrapped around the metamaterial). In some embodiments, the electrical conductor may include an electrical path. In some embodiments, the coil may be associated with a width $W_1$ when the coil is a ribbon of electrically conductive material (e.g., or a diameter when the coil is a wire). In some embodiments, the electrical path may be associated with a width $W_2$ when the electrical path is a ribbon of electrically conductive material (e.g., or a diameter when electrical path is a wire). In some embodiments, the coil may have a number of turns around the metamaterial. In this regard, for example, a turn around the metamaterial comprises a loop around the metamaterial.

As described above, in some embodiments, the width $W_1$ and/or the width $W_2$ may be proportional to the efficiency of the antenna. In some embodiments, increasing the width $W_1$ and/or the width $W_2$ may increase the efficiency of the antenna and reducing the width $W_1$ and/or the width $W_2$ may decrease the efficiency of the antenna. In some embodiments, the number of turns of the coil 108 may be proportional to the efficiency of the antenna. In some embodiments, decreasing the number of turns of the coil may increase the efficiency of the antenna and increasing the number of turns of the coil may decrease the efficiency of the antenna.

As shown in block 920, the method 900 may optionally include receiving a second signal via the antenna. As described above, the antenna may be in communication with a first computing device. In this regard, the antenna may be configured to transmit signals from the first computing device. For example, the antenna may be configured to transmit signals from the first computing device to one or more other computing devices. Additionally or alternatively, the antenna may be configured to receive signals from the one or more other computing devices. For example, the antenna may be configured to receive signals that the one or more other computing devices transmit to the first computing device.

Example Computer Processing Device

Figure 10:
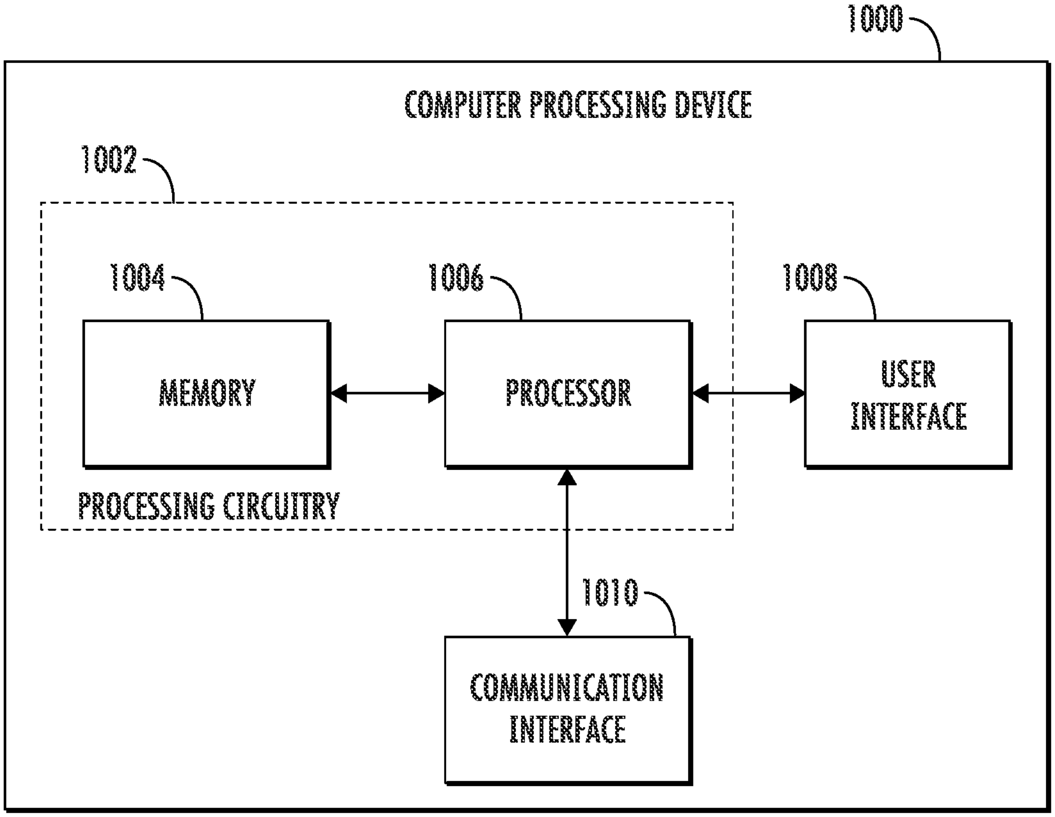
FIG. 10 illustrates a block diagram of an example computer processing device in accordance with one or more embodiments of the present disclosure.

With reference to FIG. 10, a block diagram of an example computer processing device 1000 is illustrated in accordance with some example embodiments. In some embodiments, the first computing device 702, the one or more other computing devices 704, and/or other devices may be embodied as one or more computer processing devices, such as the computer processing device 1000 in FIG. 10. However, it should be noted that the components, devices, or elements illustrated in and described with respect to FIG. 10 below may not be mandatory and thus one or more may be omitted in certain embodiments. Additionally, some embodiments may include further or different components, devices, or elements beyond those illustrated in and described with respect to FIG. 10.

The computer processing device 1000 may include or otherwise be in communication with processing circuitry 1002 that is configurable to perform actions in accordance with one or more embodiments disclosed herein, including methods described herein. In this regard, the processing circuitry 1002 may be configured to perform and/or control performance of one or more functionalities of the computer processing device 1000 in accordance with various embodiments, and thus may provide means for performing functionalities of the computer processing device 1000 in accordance with various embodiments. The processing circuitry 1002 may be configured to perform data processing, application execution and/or other processing and management services according to one or more embodiments. In some embodiments, the computer processing device 1000 or a portion(s) or component(s) thereof, such as the processing circuitry 1002, may be embodied as or comprise a chip or chip set. In other words, the computer processing device 1000 or the processing circuitry 1002 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The computer processing device 1000 or the processing circuitry 1002 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 1002 may include a processor 1006 and, in some embodiments, such as that illustrated in FIG. 9, may further include memory 1004. The processing circuitry 1002 may be in communication with or otherwise control a user interface 1008 and/or a communication interface 1010. As such, the processing circuitry 1002 may be embodied as a circuit chip (e.g., an integrated circuit chip) configured (e.g., with hardware, software or a combination of hardware and software) to perform operations described herein.

The processor 1006 may be embodied in a number of different ways. For example, the processor 1006 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 1006 may comprise a plurality of processors. The plurality of processors may be in operative communication with each other and may be collectively configured to perform one or more functionalities of the computer processing device 1000 as described herein. In some embodiments, the processor 1006 may be configured to execute instructions stored in the memory 1004 or otherwise accessible to the processor 1006. As such, whether configured by hardware or by a combination of hardware and software, the processor 1006 may represent an entity (e.g., physically embodied in circuitry-in the form of processing circuitry 1002) capable of performing operations according to embodiments of the present disclosure while configured accordingly. Thus, for example, when the processor 1006 is embodied as an ASIC, FPGA or the like, the processor 1006 may be specifically configured hardware for conducting the operations described herein. Alternatively, as another example, when the processor 1006 is embodied as an executor of software instructions, the instructions may specifically configure the processor 1006 to perform one or more operations described herein.

In some embodiments, the memory 1004 may include one or more non-transitory memory devices such as, for example, volatile and/or non-volatile memory that may be either fixed or removable. In this regard, the memory 1004 may comprise a non-transitory computer-readable storage medium. It will be appreciated that while the memory 1004 is illustrated as a single memory, the memory 1004 may comprise a plurality of memories. The memory 1004 may be configured to store information, data, applications, instructions and/or the like for enabling the computer processing device 1000 to carry out various functions in accordance with one or more embodiments. For example, the memory 1004 may be configured to buffer input data for processing by the processor 1006. Additionally or alternatively, the memory 1004 may be configured to store instructions for execution by the processor 1006. As yet another alternative, the memory 1004 may include one or more databases that may store a variety of files, contents or data sets. Among the contents of the memory 1004, applications may be stored for execution by the processor 1006 in order to carry out the functionality associated with each respective application. In some cases, the memory 1004 may be in communication with one or more of the processor 1006, user interface 1008, and/or communication interface 1010 via a bus(es) for passing information among components of the computer processing device 1000.

The user interface 1008 may be in communication with the processing circuitry 1002 to receive an indication of a user input at the user interface 1008 and/or to provide an audible, visual, mechanical or other output to the user. As such, the user interface 1008 may include, for example, a keyboard, a mouse, a display, a touch screen display, a microphone, a speaker, and/or other input/output mechanisms. As such, the user interface 1008 may, in some embodiments, provide means for a user to access and interact with the first computing device 702, the one or more other computing devices 704, and/or the antenna 100.

The communication interface 1010 may include one or more interface mechanisms for enabling communication with other devices and/or networks. In some cases, the communication interface 1010 may be any means such as a device or circuitry embodied in either hardware, or a combination of hardware and software that is configured to receive and/or transmit data from/to a network and/or any other device or module in communication with the processing circuitry 1002. By way of example, the communication interface 1010 may be configured to enable the first computing device 702 to communicate with the antenna 100, the one or more other computing devices 704 (e.g., via the antenna 100), and/or other computing devices. Accordingly, the communication interface 1010 may, for example, include an antenna (or multiple antennas) and supporting hardware and/or software for enabling communications with a wireless communication network (e.g., a wireless local area network, cellular network, global positing system network, and/or the like) and/or a communication modem or other hardware/software for supporting communication via cable, universal serial bus (USB), Ethernet or other methods.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

That which is claimed:

1. An antenna, the antenna comprising:

a metamaterial comprising a plurality of magnetic layers, wherein each of the plurality of magnetic layers is orientated along an axial direction of the metamaterial such that the metamaterial is associated with a first permeability based on a first incident wave relative to a face of a first magnetic layer of the plurality of magnetic layers and a second permeability based on a second incident wave relative to a side of the first magnetic layer; and an electrical conductor, wherein the electrical conductor comprises a coil surrounding the metamaterial.

2. The antenna of claim 1, wherein each of the plurality of magnetic layers comprises a plurality of magnetic particles dispersed in a dielectric.

3. The antenna of claim 2, wherein the plurality of magnetic particles comprise carbonyl iron.

4. The antenna of claim 1, wherein each of the plurality of magnetic layers are separated by an adhesive.

5. The antenna of claim 1, further comprising:

a housing disposed between the metamaterial and the coil.

6. The antenna of claim 1, wherein the antenna is configured to transmit or receive a signal having a frequency between 2 MHz and 60 MHz.

7. The antenna of claim 1, wherein the antenna has a maximum linear dimension of less than 50 cm.

8. The antenna of claim 1, wherein the metamaterial has a substantially cylindrical cross-sectional shape.

9. The antenna of claim 1, wherein the coil has a number of turns, wherein the number of turns is proportional to an efficiency of the antenna.

10. The antenna of claim 1, wherein the coil has a width, wherein the width is proportional to an efficiency of the antenna.

11. The antenna of claim 1, wherein second permeability is greater than the first permeability.

12. A method comprising:

receiving a signal via an antenna, wherein the antenna comprises:

a metamaterial comprising a plurality of magnetic layers, wherein each of the plurality of magnetic layers is orientated along an axial direction of the metamaterial, such that the metamaterial is associated with a first permeability based on a first incident wave relative to a face of a first magnetic layer of the plurality of magnetic layers and a second permeability based on a second incident wave relative to a side of the first magnetic layer; and an electrical conductor, wherein the electrical conductor comprises a coil surrounding the metamaterial.

13. The method of claim 12, wherein the signal has a frequency between 2 MHz and 60 MHz.

14. The method of claim 12, wherein the coil has a number of turns, wherein the number of turns is proportional to an efficiency of the antenna.

15. The method of claim 12, wherein the coil has a width, wherein the width is proportional to an efficiency of the antenna.

16. The method of claim 12, further comprising:

transmitting a second signal via the antenna.

17. A method comprising:

transmitting a signal via an antenna, wherein the antenna comprises:

a metamaterial comprising a plurality of magnetic layers, wherein each of the plurality of magnetic layers is orientated along an axial direction of the metamaterial, such that the metamaterial is associated with a first permeability based on a first incident wave relative to a face of a first magnetic layer of the plurality of magnetic layers and a second permeability based on a second incident wave relative to a side of the first magnetic layer; and an electrical conductor, wherein the electrical conductor comprises a coil surrounding the metamaterial.

18. The method of claim 17, wherein the signal has a frequency between 2 MHz and 60 MHz.

19. The method of claim 17, wherein the coil has a width, wherein the width is proportional to an efficiency of the antenna.

20. The method of claim 17, further comprising:

receiving a second signal via the antenna.

* * * * *